United States Patent
Cho et al.

(10) Patent No.: US 9,336,956 B2
(45) Date of Patent: May 10, 2016

(54) TANTALUM CAPACITOR AND METHOD OF MANUFACTURING THE SAME

(71) Applicant: SAMSUNG ELECTRO-MECHANICS CO., LTD., Suwon, Gyunggi-do (KR)

(72) Inventors: Jae Bum Cho, Gyunggi-do (KR); Kyoung Sup Choi, Gyunggi-do (KR); Hong Kyu Shin, Gyunggi-do (KR); Jeong Oh Hong, Gyunggi-do (KR); Wan Suk Yang, Gyunggi-do (KR); Hyun Sub Oh, Gyunggi-do (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 99 days.

(21) Appl. No.: 14/212,889

(22) Filed: Mar. 14, 2014

(65) Prior Publication Data

US 2015/0116910 A1    Apr. 30, 2015

(30) Foreign Application Priority Data

Oct. 31, 2013   (KR) ........................ 10-2013-0131108

(51) Int. Cl.
*H01G 9/042*   (2006.01)
*H01G 9/15*    (2006.01)
(Continued)

(52) U.S. Cl.
CPC .............. *H01G 9/15* (2013.01); *B23K 26/0084* (2013.01); *B23K 26/362* (2013.01); *B23K 26/365* (2013.01); *B23K 26/70* (2015.10);
(Continued)

(58) Field of Classification Search
CPC ....... H01G 9/012; H01G 9/025; H01G 9/042; H01G 9/00
USPC ......... 361/523–525, 528, 529, 517–519, 535, 361/536, 540–541
See application file for complete search history.

(56) References Cited

U.S. PATENT DOCUMENTS 7,619,875 B2 * 11/2009 Choi et al. .................... 361/540
7,869,190 B2 *  1/2011 Matsuoka et al. ............ 361/540
(Continued)

FOREIGN PATENT DOCUMENTS

JP    2002-25860 A    1/2002
JP    2004-071843 A   3/2004
(Continued)

OTHER PUBLICATIONS

Office Action issued on Jan. 29, 2015 in the corresponding Korean Patent Application No. 10-2013-0131108 (English translation).
(Continued)

*Primary Examiner* — Nguyen T Ha
(74) *Attorney, Agent, or Firm* — McDermott Will & Emery LLP

(57) ABSTRACT

A tantalum capacitor includes a capacitor body containing tantalum powder and having a tantalum wire extending downwardly; a molded part enclosing the capacitor body and exposing an end portion of the tantalum wire; a positive electrode lead frame disposed on a lower surface of the molded part and connected to the end portion of the tantalum wire; a negative electrode lead frame disposed on the lower surface of the molded part; and a conductive adhesive layer disposed between the capacitor body and the negative electrode lead frame.

23 Claims, 2 Drawing Sheets

(51) Int. Cl.
*H01G 9/04* (2006.01)
*B23K 26/36* (2014.01)
*B23K 26/00* (2014.01)
*H01G 9/012* (2006.01)
*H01G 9/08* (2006.01)

(52) U.S. Cl.
CPC ............... *H01G 9/012* (2013.01); *H01G 9/04* (2013.01); *H01G 9/08* (2013.01); *B23K 2201/36* (2013.01)

(56) References Cited

U.S. PATENT DOCUMENTS

| | | | |
|---|---|---|---|
| 2008/0080124 | A1 | 4/2008 | Kim et al. |
| 2009/0059477 | A1 | 3/2009 | Petrzilek et al. |
| 2010/0142125 | A1 | 6/2010 | Kim et al. |
| 2010/0302713 | A1 | 12/2010 | Zednicek et al. |

FOREIGN PATENT DOCUMENTS

| | | | |
|---|---|---|---|
| JP | 2004-281715 A | | 10/2004 |
| JP | 2009-65179 A | | 3/2009 |
| JP | 2010-278445 A | | 12/2010 |
| KR | 10-2008-0029203 A | | 4/2008 |
| KR | 10-2010-0065596 A | | 6/2010 |
| WO | WO 2013010492 | * | 7/2012 |

OTHER PUBLICATIONS

Japanese Office Action dated Sep. 1, 2015 issued in Japanese Patent Application No. 2014-033623 (English translation).

* cited by examiner

A - A'

TANTALUM CAPACITOR AND METHOD OF MANUFACTURING THE SAME

CROSS-REFERENCE TO RELATED APPLICATION

This application claims the benefit of Korean Patent Application No. 10-2013-0131108 filed on Oct. 31, 2013, with the Korean Intellectual Property Office, the disclosure of which is incorporated herein by reference.

BACKGROUND

The present disclosure relates to a tantalum capacitor and a method of manufacturing the same.

Tantalum (Ta) is a material widely used throughout various industrial sectors, such as in the aerospace industry and in the defense sector, as well as in the electrical, electronic, mechanical, and chemical fields, due to desirable mechanical and physical properties such as a high melting point, excellent flexibility, excellent corrosion-resistance, and the like.

Since tantalum can form a stable anodic oxide film, tantalum has been widely used as a material for positive electrodes of small capacitors. Recently, in accordance with the rapid development of information technology (IT), information and communications technology (ICT) and electronics technology, the use of tantalum has been increasing every year.

Generally, a capacitor is a condenser temporarily storing electricity therein, and includes two flat plate electrodes, which are disposed in close proximity to each other, and insulated from each other when a dielectric substance is inserted therebetween. The two plate electrodes may be charged with electric charges due to attractive force, thereby allowing electricity to be accumulated therein. Such a capacitor stores electric charges and electric fields in a space enclosed by two conductors, and is commonly used to acquire capacitance.

A tantalum capacitor containing a tantalum material has a structure in which voids are formed at the time of sintering and curing tantalum powder, and is completed by forming tantalum oxide ($Ta_2O_5$) on a tantalum surface using an anodic oxidation method, forming a manganese dioxide ($MnO_2$) layer, an electrolyte, on the tantalum oxide layer acting as a dielectric substance, forming a carbon layer and a metal layer on the manganese dioxide layer to form a body, forming positive and negative electrodes on the body for being mounted on a circuit board, and forming a molded part.

Since a tantalum capacitor according to the related art has a structure in which a board layer is formed on an electrode connection portion in order to connect a tantalum material and an electrode to each other, and a connection path such as a via hole is formed in the board layer, an internal space of a molded part may be relatively small, such that it may be difficult to increase efficiency of a capacitor body or achieve a wide range of design freedom in terms of positive and negative electrodes.

Therefore, a structure in which an internal lead frame is used, or a terminal is exposed to the outside without a frame has been introduced.

In the case of the structure using the internal lead frame, a space occupied by tantalum material in the molded part is decreased by the internal lead frames configuring the positive and negative electrodes, and since capacitance is in proportion to a volume of the tantalum material, capacitance may be limited correspondingly.

In the case of the structure in which the terminal is exposed to the outside without the frame, since a plurality of contact materials are present, contact resistance may be increased by the plurality of contact materials, such that equivalent series resistance (ESR) and equivalent serial inductance (ESL) of the capacitor may be increased.

Further, in the case of such a structure in which the terminal is exposed to the outside without the frame, since a negative electrode lead is positioned on a side of a product, a welding distance for forming a solder should be secured between the tantalum material and the negative electrode lead, such that an internal volume of the tantalum material may be decreased. Therefore, capacitance may be decreased.

SUMMARY

An aspect of the present disclosure may provide a tantalum capacitor manufactured by a simplified manufacturing process through having a simple structure without a via hole and improving capacitance while implementing low equivalent series resistance (ESR) and low equivalent serial inductance (ESL).

According to an aspect of the present disclosure, a tantalum capacitor may include: a capacitor body containing tantalum powder and having a tantalum wire extending downwardly; a molded part enclosing the capacitor body and a portion of the tantalum wire, and exposing an end portion of the tantalum wire; a positive electrode lead frame formed on a lower surface of the molded part and connected to the end portion of the tantalum wire; a negative electrode lead frame formed on the lower surface of the molded part; and a conductive adhesive layer formed between the capacitor body and the negative electrode lead frame.

The tantalum wire may be led out from a lower surface of the capacitor body in a vertical direction.

The tantalum wire may be led out from a lower surface of the capacitor body in an oblique direction.

The conductive adhesive layer may contain an epoxy based thermosetting resin and a conductive metal powder.

The conductive metal powder may contain at least one of silver (Ag), gold (Au), palladium (Pd), nickel (Ni), and copper (Cu).

The capacitor body and the positive electrode lead frame may be insulated from each other by the molded part.

According to another aspect of the present disclosure, a tantalum capacitor may include: a capacitor body containing tantalum powder; a tantalum wire having an insertion region positioned within the capacitor body and a non-insertion region protruding outwardly from a mounting surface of the capacitor body; a positive electrode lead frame formed on the mounting surface of the capacitor body and contacting an end portion of the non-insertion region of the tantalum wire to thereby be connected thereto; a conductive adhesive layer formed on the mounting surface of the capacitor body to be spaced apart from the tantalum wire; a negative electrode lead frame on which the capacitor body is mounted with the conductive adhesive layer; and a molded part enclosing the capacitor body and exposing mounting surfaces of the positive and negative electrode lead frames.

According to another aspect of the present disclosure, a method of manufacturing a tantalum capacitor, the method may include: preparing a capacitor body containing tantalum powder and having a tantalum wire extending from the capacitor body downwardly; forming a conductive adhesive layer by applying a conductive adhesive to a lower surface of the capacitor body; forming a molded part by molding a circumference of the capacitor body using a resin so that an end portion of the tantalum wire and a lower surface of the conductive adhesive layer are exposed; and forming a positive electrode lead frame on a lower surface of the molded part so as to be connected to the tantalum wire of the capacitor body, and forming a negative electrode lead frame so as to be connected to the conductive adhesive layer.

The positive and negative electrode lead frames may be formed by printing a conductive paste on the lower surface of the molded part.

The molded part may be cured at about 160° C. for 30 to 60 minutes in a closed oven or under a reflow curing condition after the step of forming the molded part.

A heat resistant tape may be attached to the lower surfaces of the positive and negative electrode lad frames before the step of forming the molded part, and the attached heat resistant tape may be removed from the lower surfaces of the positive and negative electrode lead frames after completion of forming the molded part.

The conductive adhesive layer may be hardened by performing a curing process at 150° C. to 170° C. for 40 to 60 minutes in a closed oven or under a reflow condition after the step of forming the molded part.

A deflashing process may be performed to remove flash generated during the step of forming the molded part, and a laser marking may be performed such that the tantalum capacitor is marked in a positive electrode direction. An aging process decreases electrical distribution.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
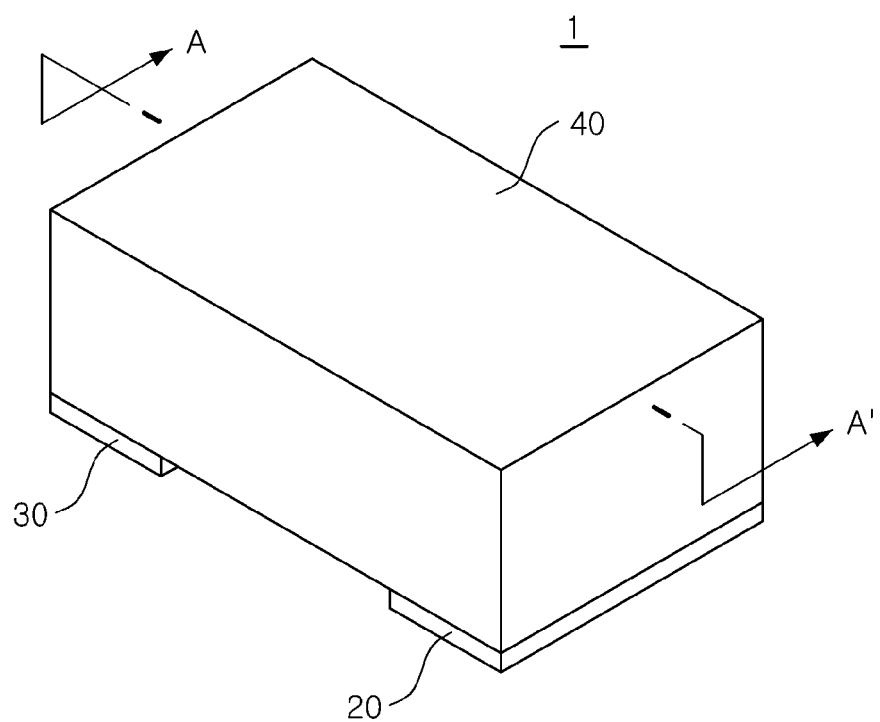
FIG. 1 is a perspective view schematically illustrating a tantalum capacitor according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Tantalum Capacitor

Figure 2:
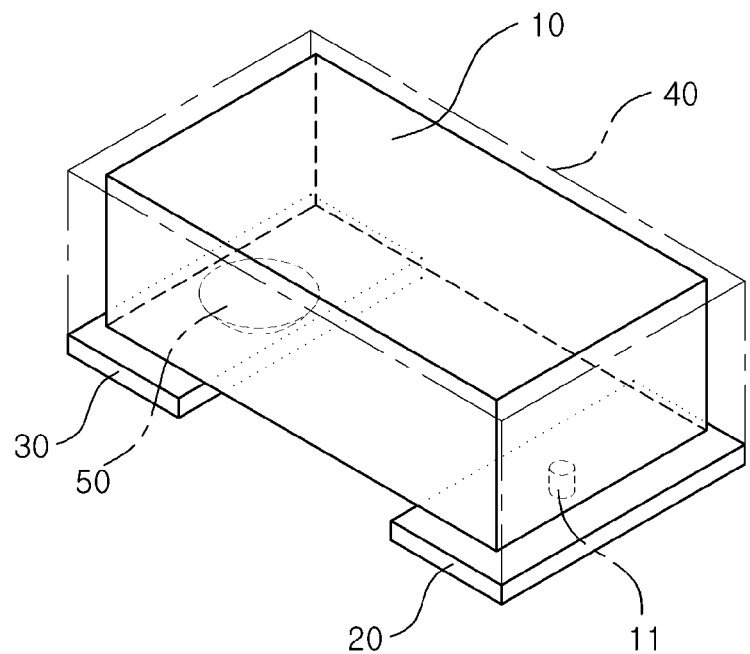
FIG. 2 is a transparent perspective view illustrating a schematic structure of the tantalum capacitor according to the exemplary embodiment of the present disclosure.
Figure 3:
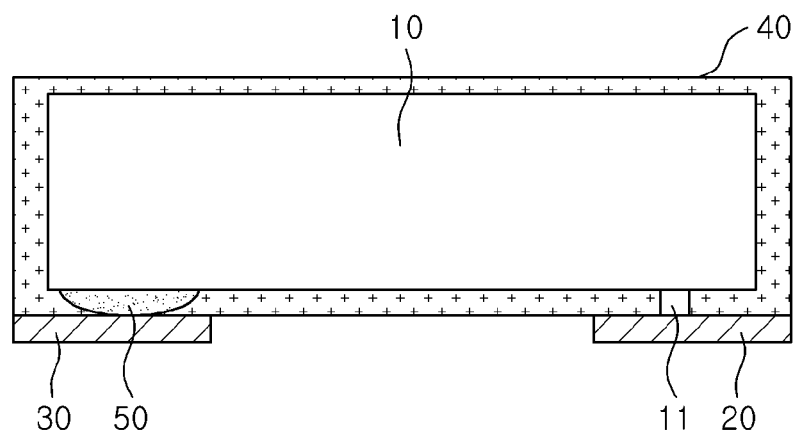
FIG. 3 is a cross-sectional view taken along line A-A' of FIG. 1.

FIG. 1 is a perspective view schematically illustrating a tantalum capacitor according to an exemplary embodiment of the present disclosure, FIG. 2 is a transparent perspective view illustrating a schematic structure of the tantalum capacitor according to the exemplary embodiment of the present disclosure, and FIG. 3 is a cross-sectional view taken along line A-A' of FIG. 1.

Referring to FIGS. 1 through 3, a tantalum capacitor 1 according to this exemplary embodiment may include a capacitor body 10; a molded part 40; a positive electrode lead frame 20; a negative electrode lead frame 30, and a conductive adhesive layer 50.

The capacitor body 10 may be formed using a tantalum material. For example, the capacitor body 10 may be manufactured by mixing and stirring tantalum powder and a binder at a predetermined ratio, compressing this mixed powder to form a rectangular parallelepiped body, and then sintering the formed rectangular parallelepiped body at a high temperature under high vacuum.

In addition, the capacitor body 10 may have a tantalum wire 11 extending downwardly.

The tantalum wire 11 may be inserted into a mixture of the tantalum powder and the binder so as to be located to one side in a lower portion of the mixture before the mixture of the tantalum powder and the binder is compressed. The tantalum wire 11 may have an insertion region positioned within the capacitor body 10 and a non-insertion region protruding outwardly from a mounting surface of the capacitor body 10.

That is, the capacitor body 10 may be manufactured by forming a tantalum element having a desired size with the tantalum wire 11 inserted into the tantalum powder mixed with the binder and then sintering the tantalum element at about 1,000° C. to 2,000° C. under high vacuum ($10^{-5}$ torr or less) for about 30 minutes.

In addition, the tantalum wire 11 may be led out from a lower surface of the capacitor body 10 in a vertical direction in order to significantly decrease a current path, but the present inventive concept is not limited thereto. If necessary, the tantalum wire may be inclined at a predetermined angle with respect to the lower surface of the capacitor body.

In this case, if necessary, carbon and silver (Ag) may be applied to a surface of the capacitor body 10.

The carbon may be provided to decrease contact resistance of the surface of the capacitor body 10, and the silver may be provided to improve electric connectivity with the negative electrode lead frame 30.

The positive electrode lead frame 20 may be formed of a conductive metal such as a nickel/iron alloy, or the like.

The positive electrode lead frame 20 may face with a lower surface of the molded part 40 and be used as a connection terminal for electrical connection with another electronic product. The positive electrode lead frame 20 may contact an end portion of the non-insertion region of the tantalum wire 11.

The negative electrode lead frame 30 may be formed of a conductive metal such as a nickel/iron alloy, or the like.

The negative electrode lead frame 30 may be disposed to be spaced apart from the positive electrode lead frame 20 in parallel therewith, and a lower surface thereof may face with the lower surface of the molded part 40 to thereby be used as a connection terminal for electrical connection with another electronic product.

The negative electrode lead frame 30 may be flat in order to secure a bonding surface with the conductive adhesive layer 50 and the molded part 40, and the conductive adhesive layer 50 and the capacitor body 10 may be sequentially mounted thereon, such that the negative electrode lead frame may be electrically connected to the capacitor body 10.

In addition, the conductive adhesive layer 50 may be formed by dispensing or dotting a predetermined amount of a conductive adhesive containing, for example, an epoxy based thermosetting resin and a conductive metal powder, but is not limited thereto.

In addition, the conductive metal powder may contain at least one of silver (Ag), gold (Au), palladium (Pd), nickel (Ni), and copper (Cu), but is not limited thereto.

The molded part 40 may be formed by transfer molding a resin such as epoxy molding compound (EMC), or the like, so as to enclose the capacitor body 10.

In this case, the molded part 40 may be formed so that at least a portion of a lower surface of the conductive adhesive layer 50 and an end portion of the tantalum wire 11 are exposed.

The molded part 40 may serve to protect the tantalum wire 11 and the capacitor body 10 and insulate the capacitor body 10 from the positive electrode lead frame 20.

In this exemplary embodiment, since the capacitor body 10 and the negative electrode lead frame 30 are directly connected to each other through the conductive adhesive layer 50, there is no need for a via hole, a printed electrode board, and the like, used in a tantalum capacitor according to the related art for connection between a capacitor body and a negative electrode, such that a structure and a manufacturing process of a product may be simplified.

In addition, the tantalum wire 11 may be directly connected to the positive electrode lead frame 20 through the lower surface of the capacitor body 10 to thereby significantly decrease a length of the current path connected from a positive electrode to a negative electrode, such that equivalent series resistance (ESR), equivalent serial inductance (ESL) and the like, electrical resistance properties of the tantalum capacitor 1, may be decreased.

Generally, as a volume of a capacitor body increases in a structure of a tantalum capacitor, capacitance of the capacitor increases, but a physical volume may also increase, resulting in a limitation to miniaturizing of a device.

In this exemplary embodiment, since a solder formed between a capacitor body and a negative electrode lead frame according to the related art is omitted and the capacitor body 10 and the positive electrode lead frame 20 are insulated from each other by a molding injection space formed on the positive electrode lead frame 20, the volume of the capacitor body 10 may be maximally secured, such that the capacitance may be increased.

Method of Manufacturing Tantalum Capacitor

Hereinafter, a method of manufacturing a tantalum capacitor according to an exemplary embodiment of the present disclosure will be described.

First, the capacitor body 10 containing tantalum powder and having the tantalum wire 11 extending downwardly may be prepared.

In this case, the tantalum wire 11 may be led out from the lower surface of the capacitor body 10 in a vertical direction in order to significantly decrease a current path, but is not limited thereto. If necessary, the tantalum wire may be inclined at a predetermined angle with respect to the lower surface of the capacitor body.

Next, the conductive adhesive layer 50 may be formed by applying a conductive adhesive to the lower surface of the capacitor body 10.

The conductive adhesive may contain an epoxy based thermosetting resin and a conductive metal powder, and the conductive adhesive layer 50 may be formed by dispensing or dotting a predetermined amount of the conductive adhesive.

The conductive adhesive layer 50, provided to attach the capacitor body 10 and the negative electrode lead frame 30 to each other to be electrically connected, may be hardened by performing a curing process at 150° C. to 170° C. for 40 to 60 minutes in a closed oven or under reflow curing conditions, after forming the molded part 40 to be described below.

In this case, the conductive metal powder may contain at least one of silver (Ag), gold (Au), palladium (Pd), nickel (Ni), and copper (Cu), but is not limited thereto.

Then, the molded part 40 may be formed by transfer molding a resin such as an epoxy molding compound (EMC), or the like, so as to enclose the tantalum wire 11 and the capacitor body 10.

In this case, a temperature of a mold may be about 170° C., and the temperature for EMC molding and other conditions may be appropriately adjusted according to components and a form of the EMC.

After molding, if necessary, the curing process may be performed at about 160° C. for 30 to 60 minutes in the closed oven or under the reflow curing conditions.

In this case, the molding process may be performed so that the end portion of the tantalum wire 11 and at least a portion of the lower surface of the conductive adhesive layer 50 are exposed externally.

Next, the positive and negative electrode lead frames 20 and 30 may be formed on the lower surface of the molded part 40.

The positive and negative electrode lead frames 20 and 30 may be formed by printing a conductive paste on the lower surface of the molded part 40, but the present inventive concept is not limited thereto.

In this case, the positive electrode lead frame 20 may be connected to the end portion of the tantalum wire 11 exposed to the lower surface of the molded part 40, and the negative electrode lead frame 30 may contact the conductive adhesive layer 50 exposed to the lower surface of the molded part 40.

As described above, in this exemplary embodiment, unlike the related art, since a process of bending or warping a conductive metal plate in order to manufacture the positive and negative electrode lead frames is omitted, the manufacturing process may be significantly simplified.

Meanwhile, in order to secure soldering stability at the time of being mounted on a substrate, exposed lower surfaces of the positive and negative electrode lead frames 20 and 30 may be symmetrical with respect to each other.

Thereafter, when formation of the molded part 40 is completed, a deflashing process for removing flash generated during the molding process may be further performed.

In addition, a laser marking may be performed in a state in which the positive and negative electrode lead frames 20 and 30 are attached, such that the tantalum capacitor may be marked with a positive electrode direction thereof, and if necessary, the corresponding capacitance.

Further, as a subsequent process, if necessary, an aging process may be further performed.

The aging process may serve to decrease electrical distribution generated during an assembly process.

Thereafter, in order to form a chip electrode according to the design, a process of removing residual portions of the positive and negative electrode lead frames 20 and 30 may be performed, thereby finally completing the tantalum capacitor.

Modified Example of Method of Manufacturing Tantalum Capacitor

Hereinafter, a method of manufacturing a tantalum capacitor according to another exemplary embodiment of the present disclosure will be described.

First, the capacitor body 10 containing tantalum powder and having the tantalum wire 11 extending downwardly may be prepared.

A tantalum capacitor using the tantalum powder may have a structure having voids generated at the time of sintering and curing tantalum powder, and the capacitor body 10 may be formed by forming tantalum oxide ($Ta_2O_5$) on a tantalum surface using an anodic oxidation method, forming a manganese dioxide ($MnO_2$) layer or conductive polymer layer, an electrolyte, on the tantalum oxide acting as a dielectric substance, and forming a carbon layer and a metal layer on the manganese dioxide layer or the conductive polymer layer.

In this case, the tantalum wire 11 may be led out from the lower surface of the capacitor body 10 in a vertical direction in order to significantly decrease a current path, but is not limited thereto. If necessary, the tantalum wire may be inclined at a predetermined angle with respect to the lower surface of the capacitor body.

Next, the positive and negative electrode lead frames 20 and 30 formed of a conductive metal plate may be disposed to face each other in parallel.

In this case, if necessary, heat resistant tape (not shown) may be attached to the lower surfaces of the positive and negative electrode lead frames 20 and 30 to form a connection therebetween.

The heat resistant tape may be used to prevent the surfaces of the positive and negative electrode lead frames 20 and 30 from being contaminated during a molding process to be subsequently performed.

Next, the conductive adhesive layer 50 may be formed by applying a conductive adhesive to an upper surface of the negative electrode lead frame 30.

The conductive adhesive may contain an epoxy based thermosetting resin and a conductive metal powder, and the conductive adhesive layer 50 may be formed by dispensing or dotting a predetermined amount of the conductive adhesive.

The conductive adhesive layer 50, provided to attach the capacitor body 10 and the negative electrode lead frame 30 to each other to be electrically connected, may be hardened by performing a curing process at 150° C. to 170° C. for 40 to 60 minutes in a closed oven or under reflow curing conditions, after forming the molded part 40 to be described below.

In this case, the conductive metal powder may contain at least one of silver (Ag), gold (Au), palladium (Pd), nickel (Ni), and copper (Cu), but is not limited thereto.

Next, the capacitor body 10 may be mounted on an upper surface of the conductive adhesive layer 50, and the tantalum wire 11 of the capacitor body 10 may be connected to an upper surface of the positive electrode lead frame 20.

Then, the molded part 40 may be formed by transfer molding a resin such as an epoxy molding compound (EMC), or the like, so as to enclose the tantalum wire 11 and the capacitor body 10.

In this case, a temperature of a mold may be about 170° C., and the temperature for EMC molding and other conditions may be appropriately adjusted according to components and a form of the EMC.

After the molding process, if necessary, the curing process may be performed at about 160° C. for 30 to 60 minutes in the closed oven or under the reflow curing conditions.

In this case, the molding process may be performed so that the lower surfaces of the positive and negative electrode lead frames 20 and 30 are exposed externally.

As described above, in this exemplary embodiment, unlike the related art, since a process of bending or warping the conductive metal plate in order to manufacture the positive and negative electrode lead frames is omitted, the manufacturing process may be significantly simplified.

Meanwhile, in order to secure soldering stability at the time of being mounted on a substrate, the exposed lower surfaces of the positive and negative electrode lead frames 20 and 30 may be symmetrical with respect to each other.

Thereafter, when formation of the molded part 40 is completed, the heat resistant tape attached to the lower surfaces of the positive and negative electrode lead frames 20 and 30 may be removed, and a deflashing process for removing flash generated during the molding process may be further performed.

In addition, a laser marking may be performed in a state in which the positive and negative electrode lead frames 20 and 30 are attached, such that the tantalum capacitor may be marked in a positive electrode direction, and if necessary, the corresponding capacitance.

Further, as a subsequent process, if necessary, an aging process may be further performed.

The aging process may serve to decrease electrical distribution generated during an assembly process.

Thereafter, in order to form a chip electrode according to the design, a process of removing residual portions of the positive and negative electrode lead frames 20 and 30 may be performed, thereby finally completing the tantalum capacitor.

As set forth above, according to exemplary embodiments of the present disclosure, since the capacitor body and the negative electrode lead frame are directly connected to each other by the conductive adhesive layer, there is no need for a via hole used in the related art, such that the structure and the manufacturing process of the product may be simplified.

In addition, the length of the current path connected from the positive electrode lead frame to the negative electrode lead frame may be significantly decreased, such that ESR, ESL, and the like, electric resistance properties of the tantalum capacitor, may be decreased.

Further, since a solder between a capacitor body and a negative electrode lead frame according to the related art is omitted and the capacitor body and the positive electrode lead frame are insulated from each other by a molding injection space formed on the positive electrode lead frame, the volume of the capacitor body may be maximally secured, such that the capacitance of the capacitor may be increased.

While exemplary embodiments have been shown and described above, it will be apparent to those skilled in the art that modifications and variations could be made without departing from the spirit and scope of the present disclosure as defined by the appended claims.

What is claimed is:

1. A tantalum capacitor comprising:
    a capacitor body containing tantalum powder;
    a tantalum wire extending from a lower surface of the capacitor body downwardly;
    a molded part enclosing the capacitor body and a portion of the tantalum wire, and exposing an end portion of the tantalum wire;
    a positive electrode lead frame disposed on a lower surface of the molded part and connected to the end portion of the tantalum wire;
    a negative electrode lead frame disposed on the lower surface of the molded part; and
    a conductive adhesive layer disposed between the capacitor body and the negative electrode lead frame,
    wherein the capacitor body substantially fills a space defined by inner surfaces of the molded part.

2. The tantalum capacitor of claim 1, wherein the tantalum wire is led out from the lower surface of the capacitor body in a vertical direction.

3. The tantalum capacitor of claim 1, wherein the tantalum wire is led out from the lower surface of the capacitor body in an oblique direction.

4. The tantalum capacitor of claim 1, wherein the conductive adhesive layer contains an epoxy based thermosetting resin and a conductive metal powder.

5. The tantalum capacitor of claim 4, wherein the conductive metal powder contains at least one of silver (Ag), gold (Au), palladium (Pd), nickel (Ni), and copper (Cu).

6. The tantalum capacitor of claim 1, wherein the capacitor body and the positive electrode lead frame are insulated from each other by the molded part.

7. The tantalum capacitor of claim 1, wherein upper and side surfaces of the capacitor body are in direct physical contact with the inner surfaces of the molded part.

8. A tantalum capacitor comprising:
a capacitor body containing tantalum powder;
a tantalum wire having an insertion region positioned within the capacitor body and a non-insertion region protruding outwardly from a mounting surface of the capacitor body;
a positive electrode lead frame disposed on the mounting surface of the capacitor body and contacting an end portion of the non-insertion region of the tantalum wire to thereby be connected thereto;
a conductive adhesive layer disposed on the mounting surface of the capacitor body to be spaced apart from the tantalum wire;
a negative electrode lead frame connected with the capacitor body via the conductive adhesive layer; and
a molded part enclosing the capacitor body and exposing the mounting surface of the capacitor body where the adhesive layer and the tantalum wire are disposed,
wherein the capacitor body substantially fills a space defined by inner surfaces of the molded part.

9. The tantalum capacitor of claim 8, wherein the tantalum wire is led out from the mounting surface of the capacitor body in a vertical direction.

10. The tantalum capacitor of claim 8 wherein the tantalum wire is led out from the mounting surface of the capacitor body in an oblique direction.

11. The tantalum capacitor of claim 8, wherein the conductive adhesive layer contains an epoxy based thermosetting resin and a conductive metal powder.

12. The tantalum capacitor of claim 11, wherein the conductive metal powder contains at least one of silver (Ag), gold (Au), palladium (Pd), nickel (Ni), and copper (Cu).

13. The tantalum capacitor of claim 8, wherein the capacitor body and the positive electrode lead frame are insulated from each other by the molded part.

14. A method of manufacturing a tantalum capacitor, the method comprising:
preparing a capacitor body containing tantalum powder and having a tantalum wire extending from the capacitor body downwardly;
forming a conductive adhesive layer by applying a conductive adhesive to a lower surface of the capacitor body;
forming a molded part by molding a circumference of the capacitor body using a resin such that an end portion of the tantalum wire and a lower surface of the conductive adhesive layer are exposed, wherein the capacitor body substantially fills a space defined by inner surfaces of the molded part;
forming a positive electrode lead frame on a lower surface of the molded part to be connected to the tantalum wire of the capacitor body; and
forming a negative electrode lead frame to be connected to the conductive adhesive layer.

15. The method of claim 14, wherein the positive and negative electrode lead frames are formed by printing a conductive paste on the lower surface of the molded part.

16. The method of claim 14, wherein the capacitor body is formed so that the tantalum wire is led out from the lower surface of the capacitor body in a vertical direction.

17. The method of claim 14, wherein the capacitor body is formed so that the tantalum wire is led out from the lower surface of the capacitor body in an oblique direction.

18. The method of claim 14, wherein the conductive adhesive contains an epoxy based thermosetting resin and a conductive metal powder.

19. The method of claim 18, wherein the conductive metal powder contains at least one of silver (Ag), gold (Au), palladium (Pd), nickel (Ni), and copper (Cu).

20. The method of claim 14, further comprising:
curing the molded part at about 160° C. for 30 to 60 minutes in a closed oven or under a reflow curing condition after the step of forming the molded part.

21. The method of claim 14, further comprising:
attaching a heat resistant tape to the lower surfaces of the positive and negative electrode lad frames before the step of forming the molded part; and
removing the attached heat resistant tape from the lower surfaces of the positive and negative electrode lead frames after completion of forming the molded part.

22. The method of claim 21, further comprising:
performing a deflashing process for removing flash generated during the step of forming the molded part;
performing a laser marking such that the tantalum capacitor is marked in a positive electrode direction; and
performing an aging process to decrease electrical distribution.

23. The method of claim 14, further comprising:
hardening the conductive adhesive layer by performing a curing process at 150° C. to 170° C. for 40 to 60 minutes in a closed oven or under a reflow condition after the step of forming the molded part.

* * * * *